(12) United States Patent
Chowdhury et al.

(10) Patent No.: US 12,716,834 B2
(45) Date of Patent: Aug. 25, 2026

(54) OPTIMIZED MIRROR-BASED LIGHT FOCUSING FOR OPTICAL SENSOR ASSEMBLY

(71) Applicant: Applied Materials, Inc., Santa Clara, CA (US)

(72) Inventors: Usman Chowdhury, Santa Clara, CA (US); Farzad Houshmand, San Jose, CA (US); Sumit Subhash Singh, Mumbai (IN); Amir H. Bayati, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 169 days.

(21) Appl. No.: 18/667,820

(22) Filed: May 17, 2024

(65) Prior Publication Data

US 2025/0305944 A1 Oct. 2, 2025

(51) Int. Cl.
*G01N 21/00* (2006.01)
*G01N 21/3504* (2014.01)

(52) U.S. Cl.
CPC . *G01N 21/3504* (2013.01); *G01N 2201/0636* (2013.01)

(58) Field of Classification Search
CPC .................. G01N 21/3504; G01N 2201/0636
See application file for complete search history.

(56) References Cited

U.S. PATENT DOCUMENTS

2025/0110379 A1* 4/2025 Laplatine .............. G01N 21/45

* cited by examiner

*Primary Examiner* — Dani Fox
(74) *Attorney, Agent, or Firm* — Lowenstein Sandler LLP

(57) ABSTRACT

Disclosed systems include a mirror having multiple optical sections positioned about an axis of the mirror. Each optical section includes an opening leading to a respective section of a light sensor and configured to collect a portion of an incident beam of light. The focal distance of the mirror is optimized and set based on a size of the opening, a size of the illuminated area of the light sensor, a distance from the mirror to the light sensor, and/or the like.

20 Claims, 11 Drawing Sheets

530

OPTIMIZED MIRROR-BASED LIGHT FOCUSING FOR OPTICAL SENSOR ASSEMBLY

RELATED APPLICATIONS

This application claims the benefit of an Indian Provisional Patent Application No. 202441025347, entitled "OPTIMIZED MIRROR-BASED LIGHT FOCUSING FOR OPTICAL SENSOR ASSEMBLY," filed Mar. 28, 2024, the entire contents of which are incorporated herein by reference.

TECHNICAL FIELD

The disclosure pertains to semiconductor manufacturing, including photonic inspection systems and components used in device manufacturing systems.

BACKGROUND

Modern semiconducting devices, such as processing units, memory devices, light detectors, solar cells, light-emitting semiconductor devices, devices that deploy complementary metal-oxide-semiconductor (CMOS) structures, and the like, are often manufactured on silicon wafers (or other suitable substrates). Manufacturing such devices often involves various deposition techniques, such as chemical vapor deposition (CVD) or physical vapor deposition (PVD), etching, photo-masking, polishing, and/or various other operations, in which atoms of one or more selected types are deposited on a substrate held in low or high vacuum environments that are provided by vacuum chambers.

BRIEF DESCRIPTION OF THE DRAWINGS

The present disclosure will be understood more fully from the detailed description given below and from the accompanying drawings of various embodiments of the disclosure.

FIG. 5A depicts a side view of a section of the multi-section mirror of FIGS. 3A-3B and FIG. 4. FIG. 5B illustrates a geometric construction used in optimizing parameters of the mirror of FIG. 5A. FIG. 5C illustrates another configuration of the mirror in which the focal point is located below the illuminated spot. FIG. 5D illustrates an alternative geometric construction, where the origin of the coordinate system is located at the center of the mirror opening, and above the focal point.

The present disclosure will be understood more fully from the detailed description given below and from the accompanying drawings of various embodiments of the disclosure.

DETAILED DESCRIPTION

Maintaining a proper environment in semiconductor manufacturing chambers is important for the quality of manufacturing yield. For example, a plasma density in a CVD chamber that is too high can result in sample etching that is too deep destroying a sample. On the other hand, a plasma density that is too low can lead to slow processing and/or sub-optimal samples. Various inspection and monitoring techniques are, therefore, deployed to measure and correct departures from optimal chamber conditions. Such techniques include optical detection systems that detect light emitted by the chamber gasses/plasma or light directed into the chamber and reflected from (or transmitted through) the chamber. Optical detection techniques allow to indirectly determine concentrations and/or pressures of various agents in the chamber atmosphere. For example, when one or more precursors are introduced into a processing chamber, e.g., a CVD chamber, an ALD chamber, and/or the like, through an inlet, a gas flow rate and a concentration of the precursors are monitored to determine an accurate amount of the precursor matter delivered to the chamber.

Figure 1A:
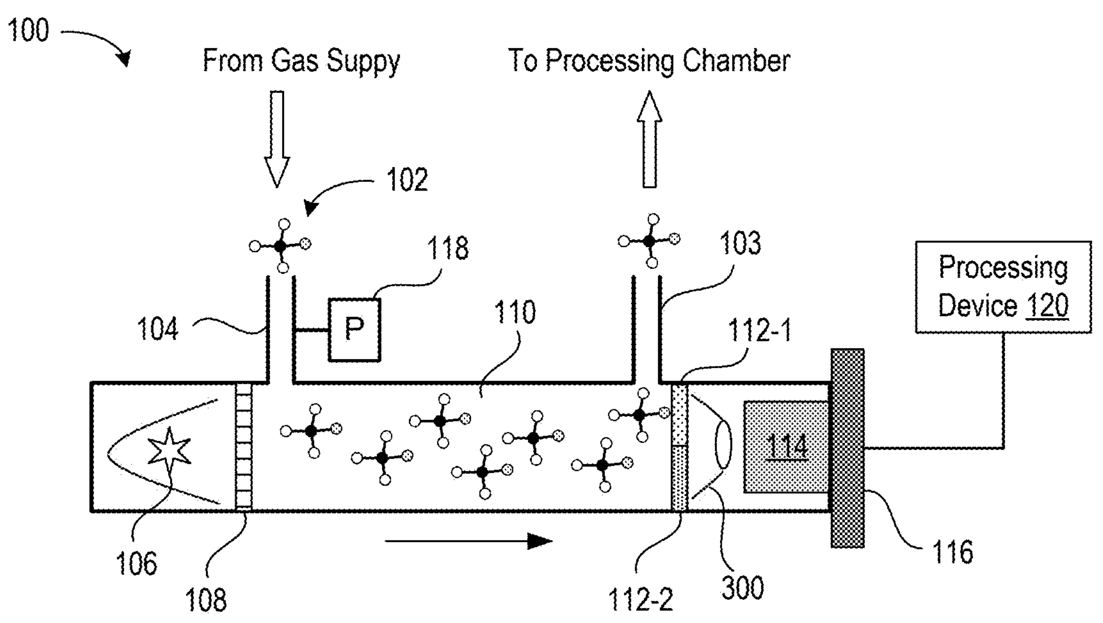
FIG. 1A is a schematic depiction of a photonic inspection system device that can be used for monitoring of a concentration of one or more precursors delivered to a processing chamber, according to at least one embodiment.

FIG. 1A is a schematic depiction of a photonic inspection system 100 that can be used for monitoring a concentration of one or more precursors delivered to a processing chamber, according to at least one embodiment. As illustrated, a precursor 102 can be carrier by an inert carrier gas—e.g., argon, neon, crypton, or some other noble gas—from a gas supply through photonic inspection system 100 to a processing chamber. In some embodiments, precursor 102 can be or include an alkylamide precursor, e.g., Pentakis(dimethylamino)tantalum (PDMAT), Tetrakis(dimethylamino)titanium (TDMAT), and/or the like. The carrier gas with precursor 102 flows through an inlet 104 and out of an outlet 103. Pressure in gas inlet 104 (or gas outlet 103) can be monitored using a pressure sensor 118 to control a flow rate of the carrier gas. The concentration of precursor 102 can be monitored using non-dispersive infrared (NDIR) sensor. An NDIR system can include a light source 106, which can emit light in a broad band of wavelengths (frequencies). Light emitted by light source 106 can pass through a transparent window 108 into a cell 110 containing the particles of precursor 102. Light emitted by light source 106 can further be processed using any suitable optical elements, e.g., collimating lenses, polarizers, and/or the like. The light transmitted through cell 110 can be partially absorbed by the particles before reaching photodetector 114. Photodetectors 114 can include metal-semiconductor-metal photodetectors, photodiodes, phototransistors, photomultiplier tubes, and/or any other suitable light sensors that generates signals representative of a number of detected photons (amount of light). Prior to reaching photodetector 114, the light transmitted through cell 110 can pass through one or more filters 112-*n* (e.g., filters 112-1, 112-2, etc.) selectively admitting or rejecting light within a specific range of wavelengths. Individual filters 112-*n* can be selected in view of the absorption properties of precursor 102, e.g., as described in more detail below in conjunction with FIG. 1B. In some embodiments, photodetector 114 can include multiple portions, each portion of photodetector 114 receiving a respective portion of the incident light, which can further be filtered using a respective filter 112-*n*.

In some embodiments, photodetector 114 can generate a plurality of sets of data, each set of data can be generated by a respective portion of photodetector 114 and representative of absorption of light by the gas in cell 110 in a specific range wavelength (frequencies). In some embodiments, photodetector 114 can include an operational amplifier, an analog-to-digital converter (ADC), a thermopile sensor, and resistance temperature detector (RTD), a pyroelectric sensor, and/or one or more additional devices. Photodetector 114 can be connected to a printed circuit board (PCB) 116 that hosts a memory device to collect light sensing data. PCB 116 can further include a processing device (e.g., a microcontroller, a central processing unit (CPU), or some other processing device) that controls operations of photodetector 114. In some embodiments, the processing device of PCB 116 can determine concentration of the particles of precursor 102 (or multiple types of precursors 102) in cell 110. In some embodiments, photodetector 114 can be communicatively coupled (e.g., via a PCB 116) to an external processing device 120, which can use the sets of data generated by photodetector 114 to determine an amount of a target substance in the gas, e.g., a concentration of one or more precursors in the gas.

Figure 1B:
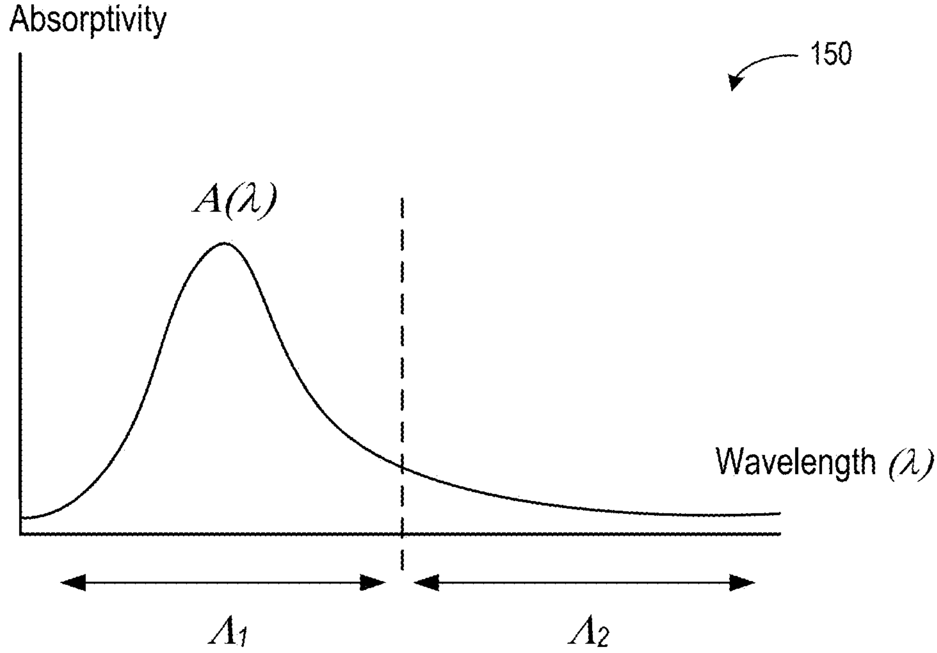
FIG. 1B illustrates schematically an absorptivity of a precursor as a function of wavelength, according to at least one embodiment.

FIG. 1B illustrates schematically absorptivity 150 of precursor 102 as a function of wavelength, according to at least one embodiment. The absorptivity $A(\lambda)$ (which can refer to a molar absorptivity or absorptivity per particle) can be larger in one range of the electromagnetic spectrum (denoted schematically with $\Lambda_1$) and smaller in another range (denoted schematically with $\Lambda_2$). According to the Beer-Lambert law, the absorbance—defined as a fraction of light of a particular wavelength $\lambda$ that is absorbed over a certain optical path—is proportional to the absorptivity $A(\lambda)$, a concentration n of the particles of a light-absorbing material, and the length L of the optical path of light in cell 110. The amount of light reaching photodetector 114 is also proportional to the transmittance $T(\lambda)$ of filters 112-*n* at the respective wavelengths. In some embodiments, filter 112-1 can have high transmittance in the range $\Lambda_1$ of a high precursor absorptivity and a low transmittance outside this range. Similarly, filter 112-2 can have high transmittance in the range $\Lambda_2$ of high precursor absorptivity and a low transmittance outside it. Correspondingly, intensity $I_1$ of the light that passes through filter 112-1 and is collected by photodetector 114 can be representative of the amount of particle of precursor 102 while intensity $I_2$ of the light that passes through filter 112-2 (also collected by photodetector 114 or a different part of photodetector 114) can serve as a reference signal.

Figures 2A, 2B:
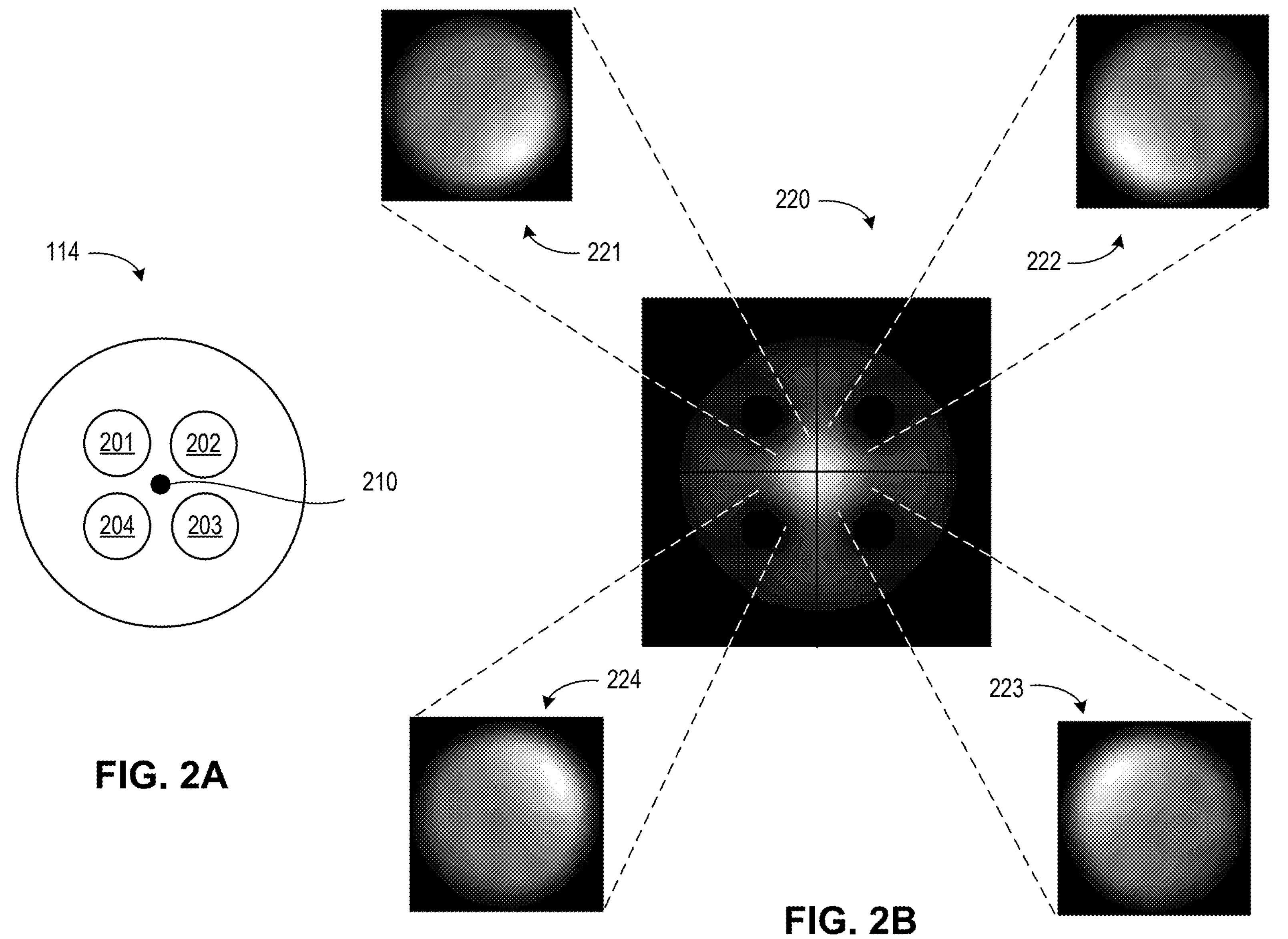
FIG. 2A illustrates schematically a cross-sectional view of a photodetector, according to at least one embodiment.
FIG. 2B depicts an intensity map of light that is incident on the photodetector of FIG. 2A, according to at least one embodiment.

FIG. 2A illustrates schematically a cross-sectional view of photodetector 114, according to at least one embodiment. As illustrated, photodetector 114 has four sections 201 . . . 204 symmetrically positioned about the axis 210 of photodetector (denoted schematically with the black dot), but photodetector 114 can have any other number of sections, in other embodiments. For example, sections 201 and 203 can detect light (e.g., in conjunction with appropriately positioned—in front of the receptive sections—filters 112-1) in the range $\Lambda_1$ of the high precursor absorptivity, and sections 202 and 204 can detect reference light (in conjunction with filters 112-2) in the range $\Lambda_2$ of the low precursor absorptivity.

FIG. 2B depicts an intensity map 220 of light that is incident on photodetector 114, according to at least one embodiment. (Intensity map 220 is obtained using numerical simulations performed for photodetector 114 of FIG. 2A.) Zoomed maps 221, 222, 223, and 224 indicate the light that is collected by the respective sections 201, 202, 203, and 204 of photodetector 114. As illustrated with FIG. 2B, the symmetric positioning of sections 201 . . . 204 about the axis of photodetector 114 (such symmetric positioning allows effective collection of the reference light data), causes the highest-intensity light (concentrated near axis 210) to be lost. This degrades the signal-to-noise ratio (SNR) of the optical signal collected by sections 201 . . . 204. Additionally, the maximum intensity light collected by the sections 201 . . . 204 is strongly skewed off-center for each section.

The existing techniques of improving the optical signal include increasing power of light source 106 (with reference to FIG. 1A) or deploying focusing lenses with photodetector 114. Such techniques, however, have significant costs and drawbacks. For example, increased source power leads to a shorter lifetime of light source 106. Lenses are expensive and complex (especially in the infrared ranges of wavelengths as often used in the photonic instruments) and generally introduce dispersion, which degrades the quality of the light beam, and which can be difficult and/or expensive to control in a broad range of wavelengths.

Figure 3B:
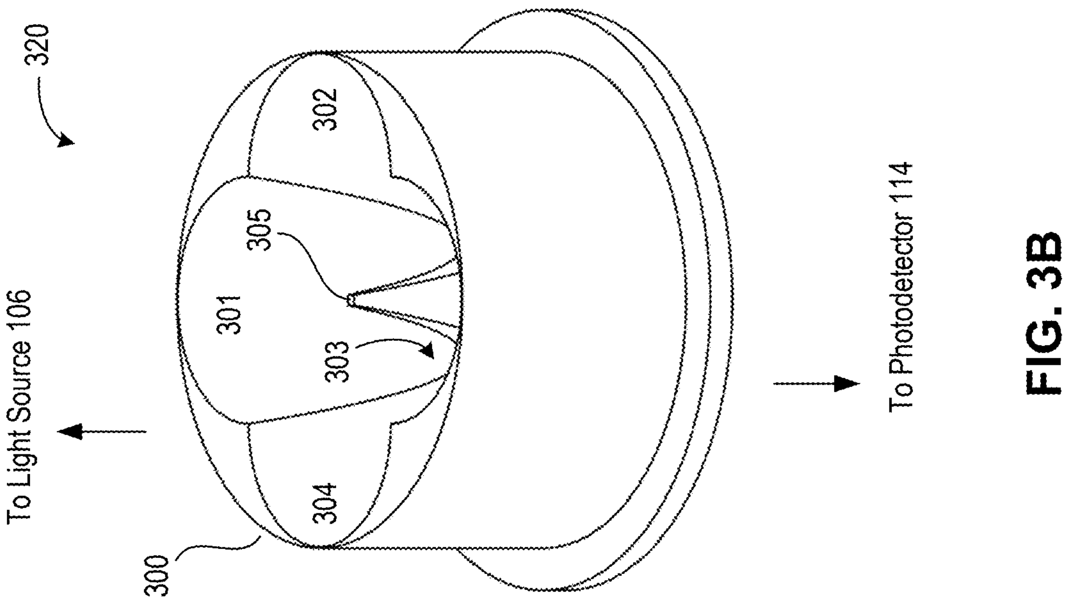
FIG. 3B depicts an isometric view of the multi-section mirror, according to at least one embodiment.
Figure 3A:
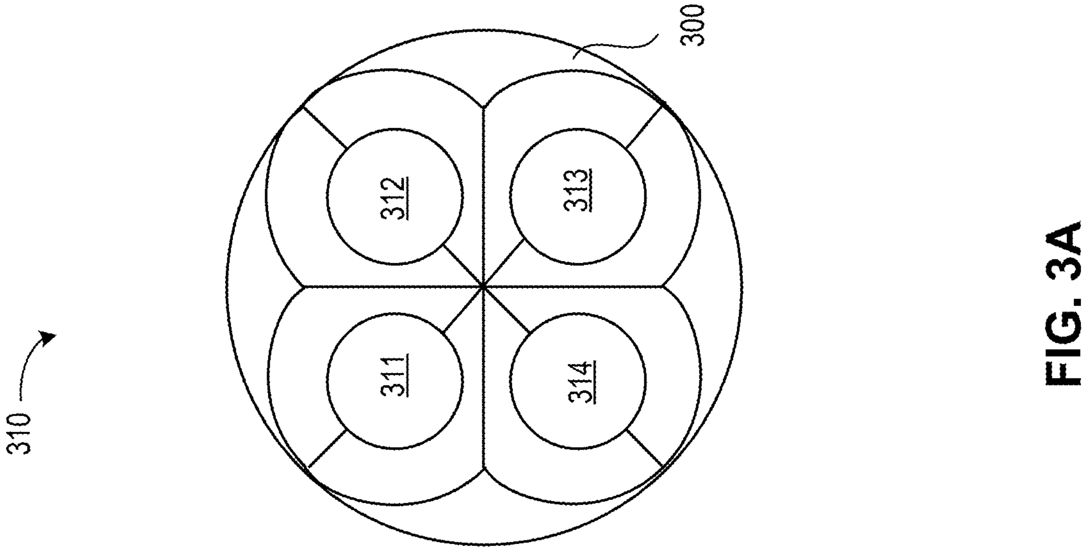
FIG. 3A depicts a frontal view of a multi-section mirror, according to at least one embodiment.
Figures 3C, 3D, 3E:
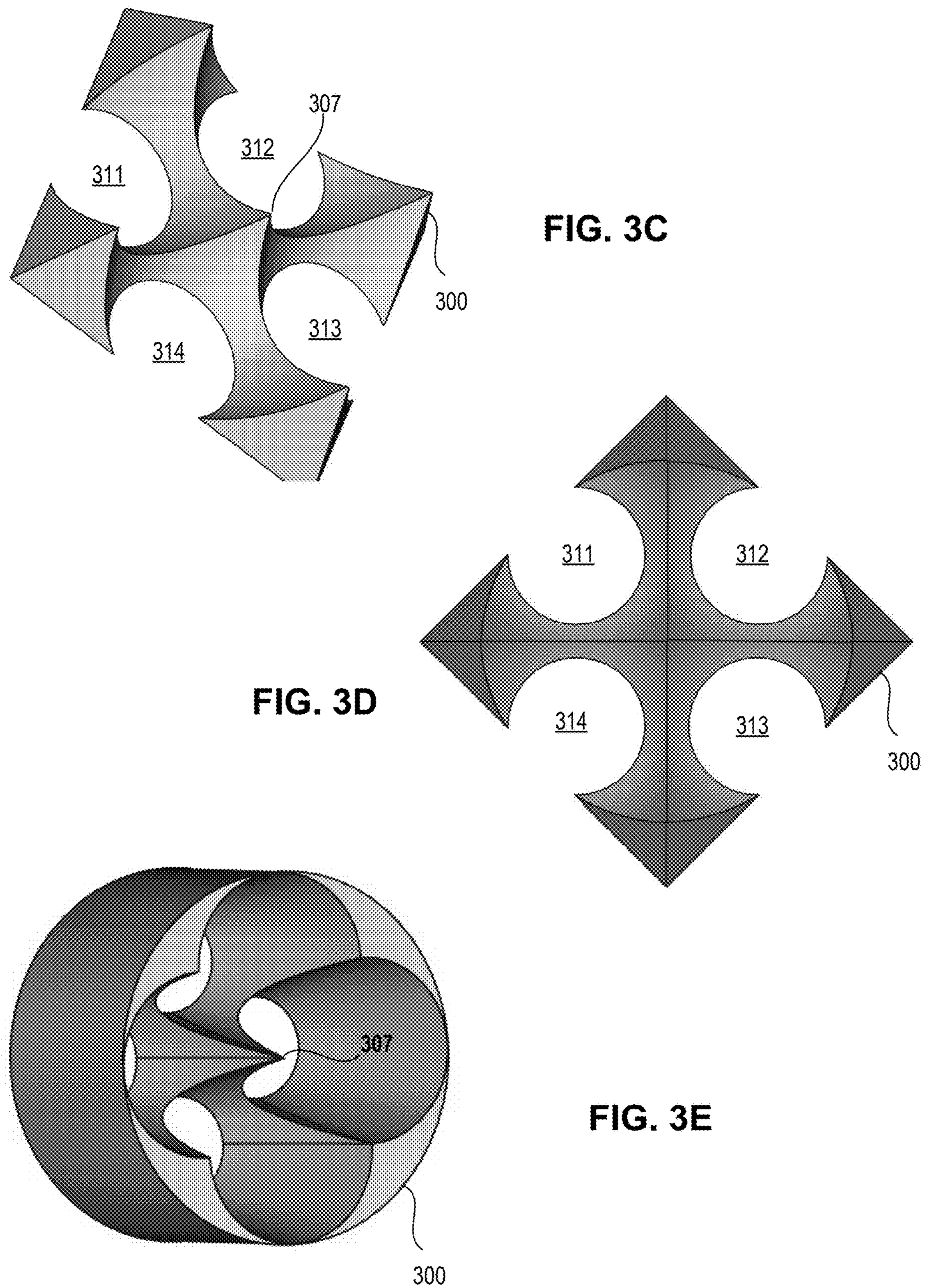
FIG. 3C and FIG. 3D illustrate another example embodiment of a multi-section mirror without a complete enclosure of the sections of the mirror, according to at least one embodiment.
FIG. 3E illustrates yet another embodiment with a sharp central tip of the multi-section mirror.

Aspects and embodiments of the present disclosure address these and other challenges of the modern photonic inspection and monitoring technologies by providing for sensing systems that deploy optimized mirror-based optics for efficient collection of off-axis light. FIG. 3A depicts a frontal view 310 of a multi-section mirror 300, according to at least one embodiment. FIG. 3B depicts an isometric view 320 of the multi-section mirror 300, according to at least one embodiment. As illustrated, multi-section mirror 300 can include four sections 301, 302, 303, and 304 implemented as part of an integrated optical element, which can be machined, cast, or otherwise manufactured in a common body. The sections 301, 302, 303, and 304 can have voids or openings 311, 312, 313, and 314 to channel the light focused by the respective sections 301, 302, 303, and 304 to photodetector 114 (not explicitly shown in FIGS. 3A-3B), which can be positioned behind the multi-section mirror 300, e.g., as depicted in FIG. 1A. FIG. 3C and FIG. 3D illustrate another example embodiment of a multi-section mirror without a complete enclosure of the sections of the mirror. While FIG. 3B illustrates a tapered tip 305 (which can be more cost-effective to manufacture), FIG. 3C and FIG. 3E illustrate a pointed tip 307 (which can be more efficient performance-wise). In some embodiments, a rounded tip can be used.

Figure 4:
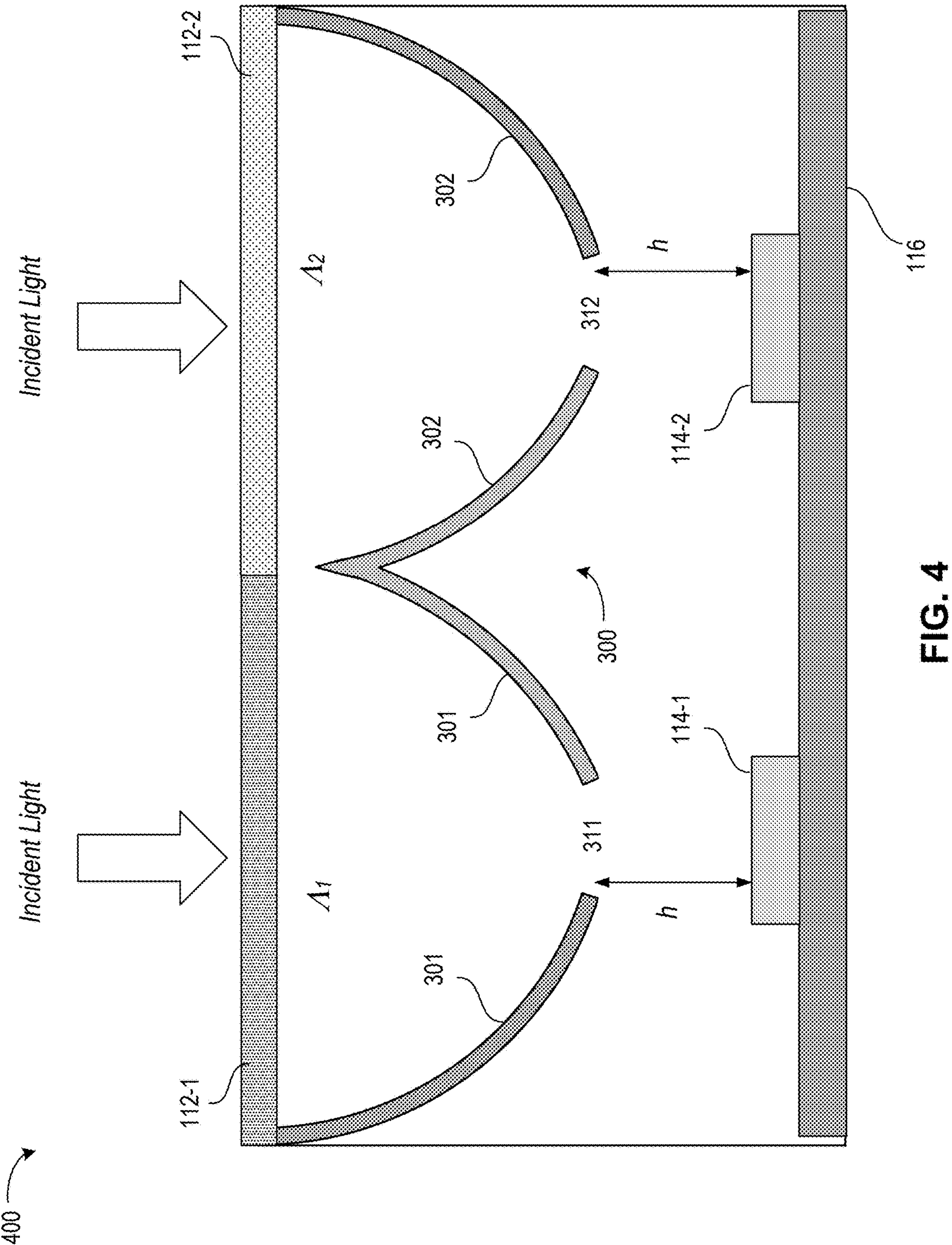
FIG. 4 depicts a schematic view of a photodetector assembly that deploys a multi-section mirror for efficient collection of light in photonic (e.g., optical) inspection systems, according to at least one embodiment.

FIG. 4 depicts a schematic view of a photodetector assembly 400 that deploys multi-section mirror 300 for efficient collection of light in photonic (e.g., optical) inspection systems, according to at least one embodiment. For conciseness and ease of viewing, photodetector assembly 400 shows two sections capable of collecting light corresponding to different spectral portions, but the number of sections (e.g., three, four, six, and so on) need not be limited. The light incident on photodetector assembly 400 (e.g., the light that travels through cell 110 that contains precursor 102, with reference to FIG. 1A) can be filtered by filters 112-1 and 112-2 before interacting with respective sections 301 and 302 of multi-section mirror 300. Multi-section mirror 300 can serve as objective of photodetector assembly 400 with sections 301 and 302 collecting light from a wide cross-sectional area of the incident light beam and channeling the collected light through respective openings 311 and 312 towards respective sections 114-1 and 114-2 of the photodetector. Openings 311 and 312 can be located at some distance h from the photodetector sections 114-*n*. In some example embodiments, distance h can be of the order of several millimeters to several centimeters, e.g., 4 mm, 5 mm, and/or the like. In some embodiments, distance h can be adjustable (e.g., as part of a focusing mechanism) to vary the size of the light spot on the photodetector sections 114-1 and 114-2. In some embodiments, filters 112-1 and 112-2 can be positioned between the multi-section mirror 300 and photodetector sections 114-1 and 114-2. Various other elements not shown in FIG. 4 can be included in photodetector assembly 400, including but not limited to one or more polarizers, lenses, masks, directional filters, and/or the like. In some embodiments, multi-section mirror 300 can be made of a conducting material, e.g., silver. In some embodiments, multi-section mirror 300 can be made of a non-conducting material, e.g., glass or a plastic material coated with a film of one or more conducting materials, e.g., gold, silver, and/or the like. A type of the coating(s) can be made in conjunction with the spectral range $\Lambda_1$, $\Lambda_2$, etc., of the respective filter 112-*n*. In some embodiments, different sections 301, 302, etc., of multi-section mirror 300 can be made of different materials and/or coated with different materials.

Figures 5A, 5B:
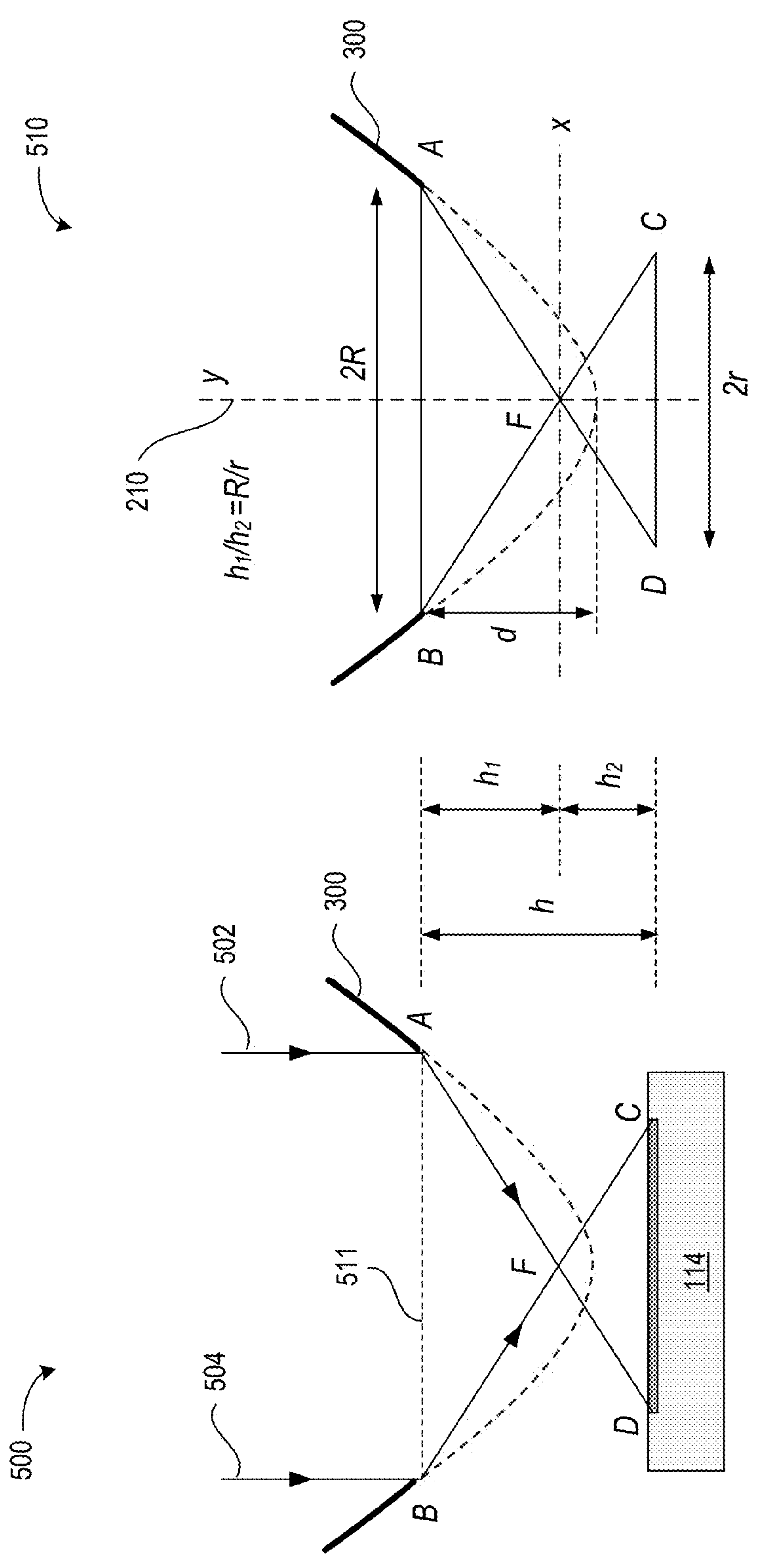
FIGS. 5A-5D illustrate optimization of a mirror that can be deployed for efficient collection of light in photonic (e.g., optical) inspection systems, according to at least one embodiment.
Figure 5C:
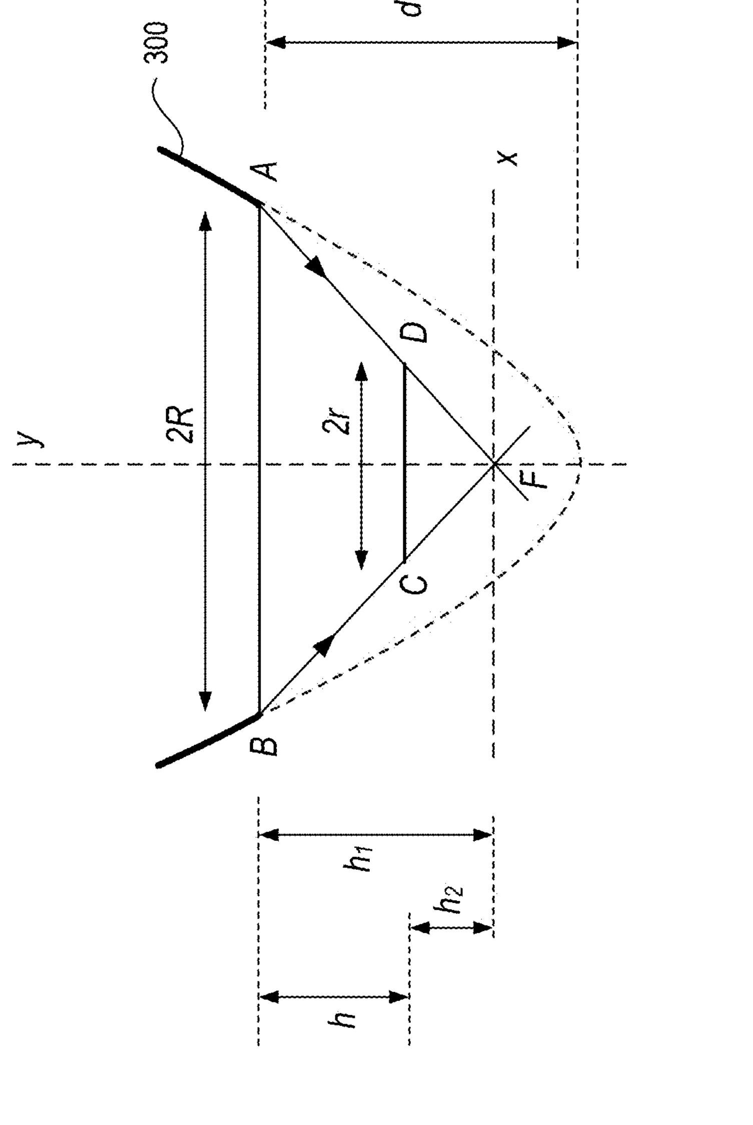

FIGS. 5A-5C illustrate optimization of a mirror that can be deployed for efficient collection of light in photonic (e.g., optical) inspection systems, according to at least one embodiment. FIG. 5A depicts a side view 500 of a section (e.g., section 301) of multi-section mirror 300 of FIGS. 3A-3B and FIG. 4. In some embodiments, mirror 300 can be a parabolic mirror. The opening 511 in mirror 300 is indicated with line AB, points A and B located on the rim of the opening 511. (For conciseness, FIG. 5A does not show filters 112-*n*.) Two beams of incident light are shown in FIG. 5A. Beam 502 reflects from mirror 300 at the rim point A, passes through a focal point F of mirror 300, and strikes photodetector 114 at a point C. Similarly, beam 504 reflects from mirror 300 at the rim point B, passes through the focal point F, and strikes photodetector 114 at a point D. The line CD represents the cross-section of the illuminated portion (spot) of photodetector 114 (or one section of photodetector 114). The radius of the illuminated spot is denoted herein via r, the diameter of the spot being CD=2r. Similarly, the radius of the opening 511 is denoted herein via R, the diameter of the opening being AB=2R. In some embodiments, R>r while in other embodiments, R<r (or R=r). Distance h between the plane of the opening 511 and the surface of photodetector 114 can be apportioned as, $h=h_1+h_2$, where $h_1$ is the distance between the plane of the opening 511 and the focal point F and $h_2$ is the distance between the focal point F and the surface of photodetector 114.

FIG. 5B illustrates a geometric construction 510 used in optimizing parameters of the mirror of FIG. 5A. In some embodiments, radius r of the illuminated spot CD, distance h, and radius R of the opening AB can be used as an input parameters and focal distance of the mirror $f$ can be an output of the optimization. FIG. 5B further shows a system of Cartesian coordinates x, y with the origin at the focal point F and the y-axis along the symmetry axis 210 of the mirror/photodetector assembly. The family of the parabolas having the focal point F at the origin of the coordinate system, x=0, y=0 obey the following equation (referred to as the equation of the parabolas herein), $$y(x) = \frac{x^2}{4f} - f,$$

From the similarity of the triangles ABF and CDF, it follows that the ratio of the distances $h_1$ and $h_2$ is $h_1/h_2=R/r$, and therefore, $$h_1 = \frac{hR}{R+r},\ h_2 = \frac{hr}{R+r}.$$

On the other hand, the coordinates of the point A in the selected Cartesian system are x=R and $y=h_1$. Substitution of these values into the equation of the parabolas yields the following quadratic equation:

$$\frac{hR}{R+r} = \frac{R^2}{4f} - f,$$

for the focal distance $f$. The solution of this equation, $$f = \frac{R}{2(R+r)}\left(\sqrt{h^2+(R+r)^2} - h\right),$$

determines the focal distance as a function, $f=f(R,r,h)$, of the size of the opening R, the size of the spot r, and the distance h from the plane of the opening to the surface of the photodetector. The vertex of the parabola is located at a distance of $$d = h_1 + f = \frac{R}{2(R+r)}\left(\sqrt{h^2+(R+r)^2} + h\right),$$

from the opening AB of the mirror. In particular, the product $fd$ the focal distance and the distance to the vertex is independent of both h and r and depends only on the radius of the opening: $fd=R^2/4$.

In one example embodiment of R=2 mm, r=1 mm, h=4 mm, the focal distance of the mirror, $f=1/3$ mm, and the vertex of the parabola is located at distance d=3 mm below the opening AB of the mirror and at distance h−d=1 mm above the surface CD of the photodetector.

FIG. 5C illustrates another configuration 520 of mirror 300 in which the focal point of the mirror is located below the illuminated spot CD. In this configuration, the distance $h=h_1-h_2$, and the same similarity condition $h_1/h_2=R/r$ holds, leading to $$h_1 = \frac{hR}{R-r}, \quad h_2 = \frac{hr}{R-r}. \quad \text{Eq. (6)}$$

Since the same equation of the parabolas applies for this configuration, the focal distance is determined by the following formula, $$\tilde{f} = \frac{R}{2(R-r)}\left(\sqrt{h^2+(R-r)^2}-h\right). \quad \text{Eq. (7)}$$

The distance from the plane of the opening AB to the vertex of the parabola is again determined by the relation $d=h_1+\tilde{f}=R^2/4\tilde{f}$ that is similar to the case of the configuration of FIG. 5B. Unlike focal distance $f$, which exists for any relationship between the radius R of the opening and the radius r of the target spot, the focal distance $\tilde{f}$ can be defined provided that R>r.

Figure 5D:
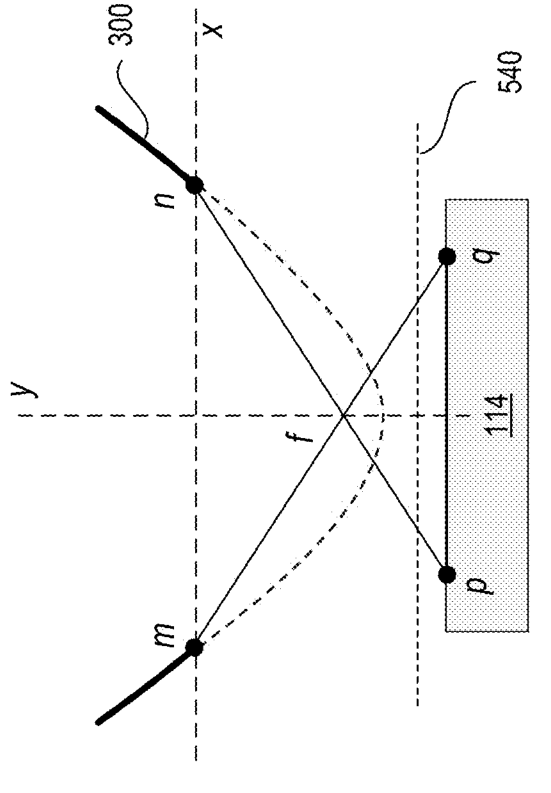

FIG. 5D illustrates an alternative geometric construction 530, a configuration of the with the origin of the coordinate system located at the center of the mirror opening defined by points m and n (corresponding to points B and A in FIGS. 5A-5B). The surface of photodetector 114 is defined by points p and q (corresponding to points D and C in FIGS. 5A-5B). The points m, n, p, q define the beam envelope by the two intersecting straight-lines, as shown in FIG. 5D. The intersection point of these two straight-lines defines the focus $f$ of the parabola. The points m, n and the focus $f$ together constraints a unique parabola The general form of a parabola is $y=ax^2+k$, where a is the parabolic constant, and k is the vertical axis offset of the vertex of the parabola. The equations for the two straight lines that define the boundary of the beam that is collected and routed to the sensor are:

$$y = \frac{-y_q}{x_m - x_q}(x - x_m), \quad y = \frac{-y_p}{x_n - x_p}(x - x_n).$$

Since the origin of the coordinate system is located symmetrically with respect to the lines mn and pq, the coordinates obey the conditions, $|x_m|=|x_n|$, $|x_p|=|x_q|$, $|y_p|=|y_q|$. The lines intersect at $$y_f = \frac{y_p}{x_m + x_p}x_m;\ x_f = 0.$$

A parabola has the focus at $(x_f, y_f)$ and passes through points m and n. Solving the parabolic equation for point m, we obtain $$a = \frac{-k}{x_n^2}.$$

The equation of the directrix is given by:

$$y = k + (k - y_f) = 2k - y_f$$

According to the properties of the parabola, the distance of any point of the parabola, e.g., n, from the focus is the same as the distance from that point to the directrix 540 of the parabola:

$$\sqrt{(x_n-0)^2+(0-y_f)^2} = \sqrt{(x_n-x_n)^2+(0-(2k-y_f))^2}$$

Solving for k gives us:

$$k = \frac{y_f - \sqrt{{y_f}^2 + x_n^2}}{2}.$$

We keep only the solution that will yield a negative value for k to give us a parabola that is open towards the +y axis. and $$a = \frac{k}{x_n^2} = \frac{1}{x_n^2}\left[\frac{y_f - \sqrt{{y_f}^2 + x_n^2}}{2}\right].$$

This yields the final formula for the parabola:

$$y = ax^2 + k = \left[\frac{y_f - \sqrt{{y_f}^2 + x_n^2}}{4}\right]\left(\frac{1}{x_n^2}x^2 + 1\right)$$

where $$y_f = \frac{y_p}{x_n + x_q}x_n.$$

The coordinates used in reference to FIG. 5D are related to the parameters used in reference to FIGS. 5A-5C according to $|x_n|=R$, $|x_q|=r$, and $-y_p=h$.

The systems and techniques disclosed in conjunction with FIG. 1 and FIGS. 3-5 have significant advantages compared with the existing technology. In particular, the need to boost the power of the light source 106 is now eliminated (or significantly reduced), as the multi-section mirror collects the light that would be wasted in the conventional systems. The disclosed systems and techniques further eliminate the need for expensive refractive optics. Reduction in the consumed power and the use of reflective optics (which is less susceptible to dispersion artifacts) significantly reduces the number of potential failure points of the photonic detection systems.

Figure 6A:
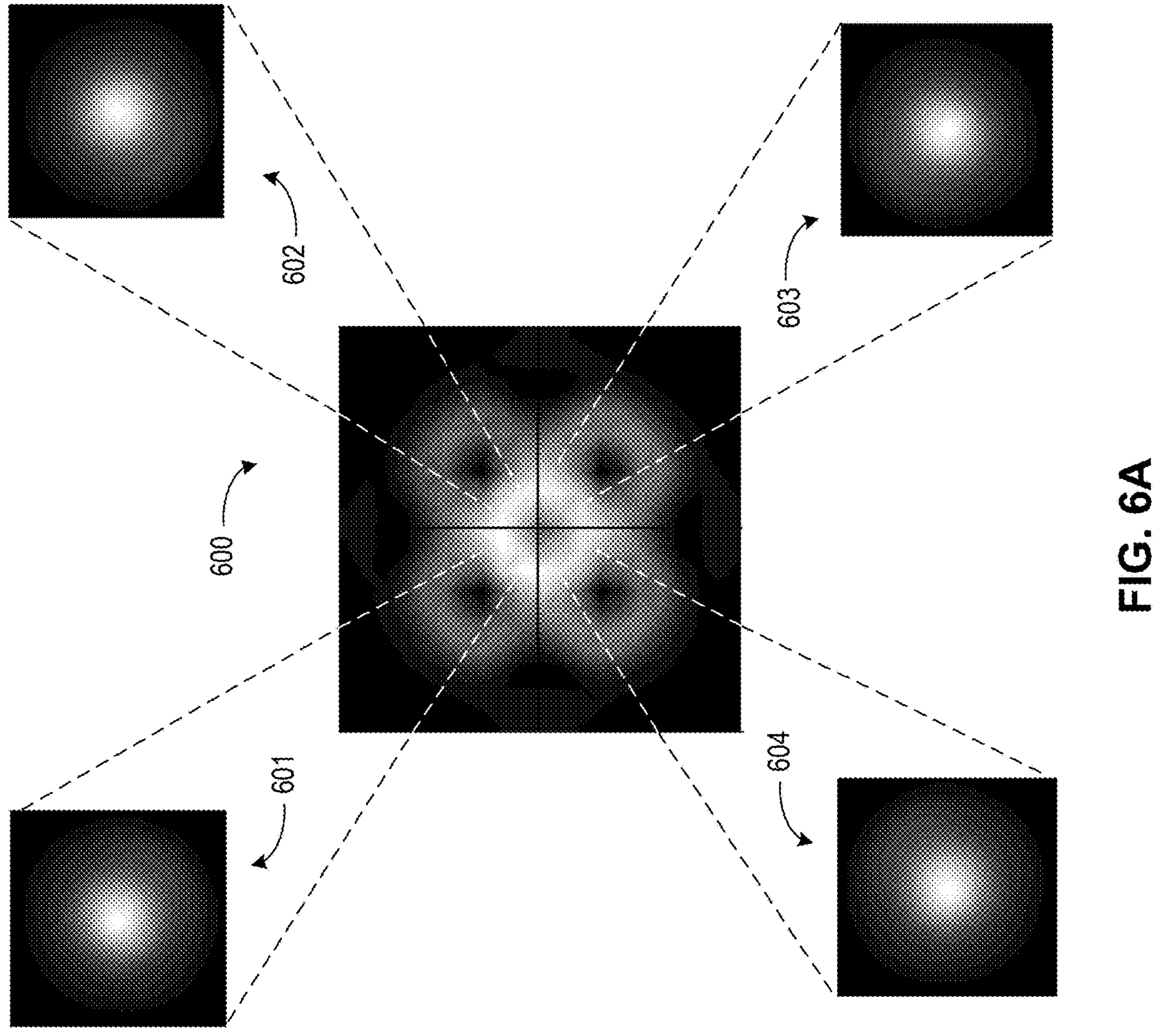
FIG. 6A-6B illustrate an intensity map of light, incident on a photodetector and focused by a multi-section mirror, according to at least one embodiment.
Figure 6C:
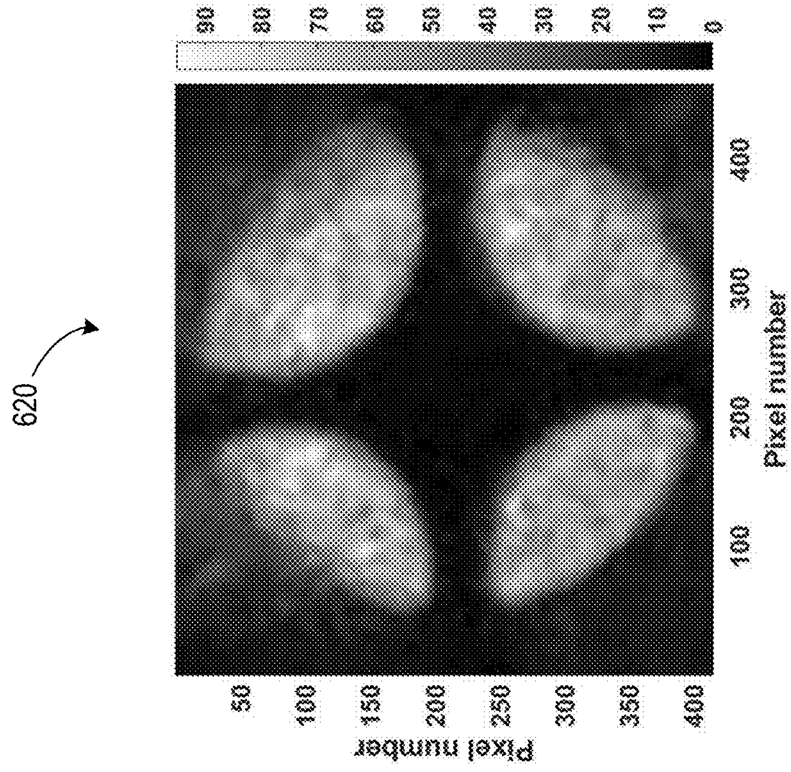
FIG. 6C illustrates an intensity map of light incident on the photodetector in the absence of the multi-section mirror.
Figure 6B:
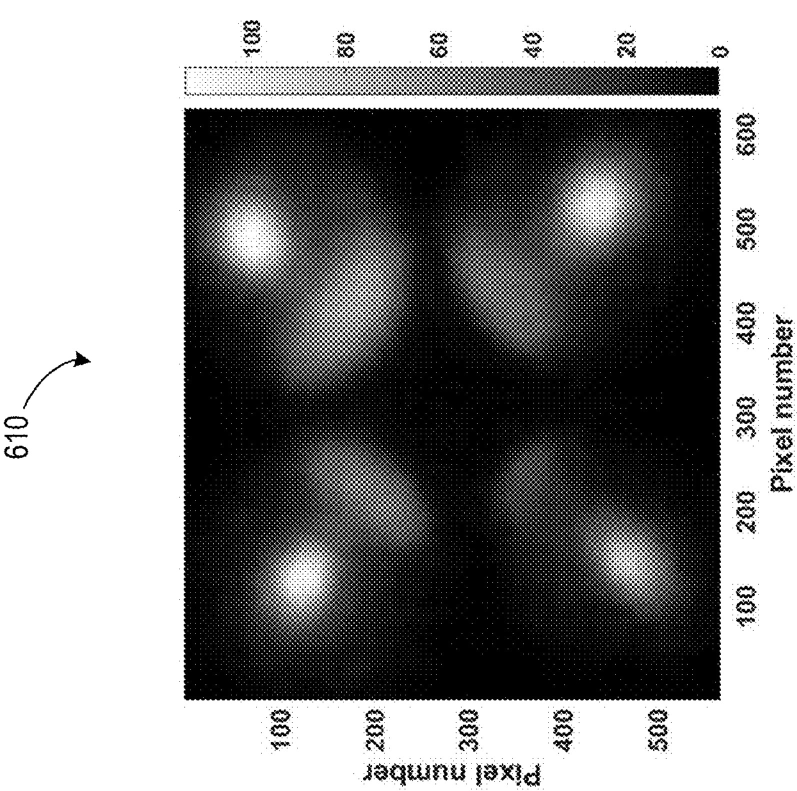

FIG. 6A depicts an intensity map 600 of light, incident on photodetector 114 and focused by a multi-section mirror, according to at least one embodiment. Callout maps 601, 602, 603, and 604 indicate the light that is collected and focused by the respective sections 301, 302, 303, and 304 of mirror 300 (with reference to FIG. 3B). Darker (brighter) portions correspond to the regions of a higher (lower) optical signal. As illustrated with FIG. 6A, deployment of the multi-section mirror causes the maxima of the optical signal to shift towards the centers of openings 311, 312, 313, and 314 (with reference to FIG. 3A) by more efficiently harvesting light that propagates near the center of the axis of the light (the axis of the mirror). This improves the SNR of the optical signal collected by photodetector sections 201 . . . 204 (with reference to FIG. 2A). Intensity map 600 is obtained using numerical simulations. FIG. 6B illustrates experimentally measured intensity map 610 of light incident on photodetector 114 and focused by the same multi-section mirror as used in the illustration in FIG. 6A. In contrast, FIG. 6C illustrates experimentally measured intensity map 620 of light incident on photodetector 114 in the absence of the multi-section mirror. The maximum intensity of light at the focal points in FIG. 6B is approximately 2-3 times brighter than in FIG. 6C.

Figure 7:
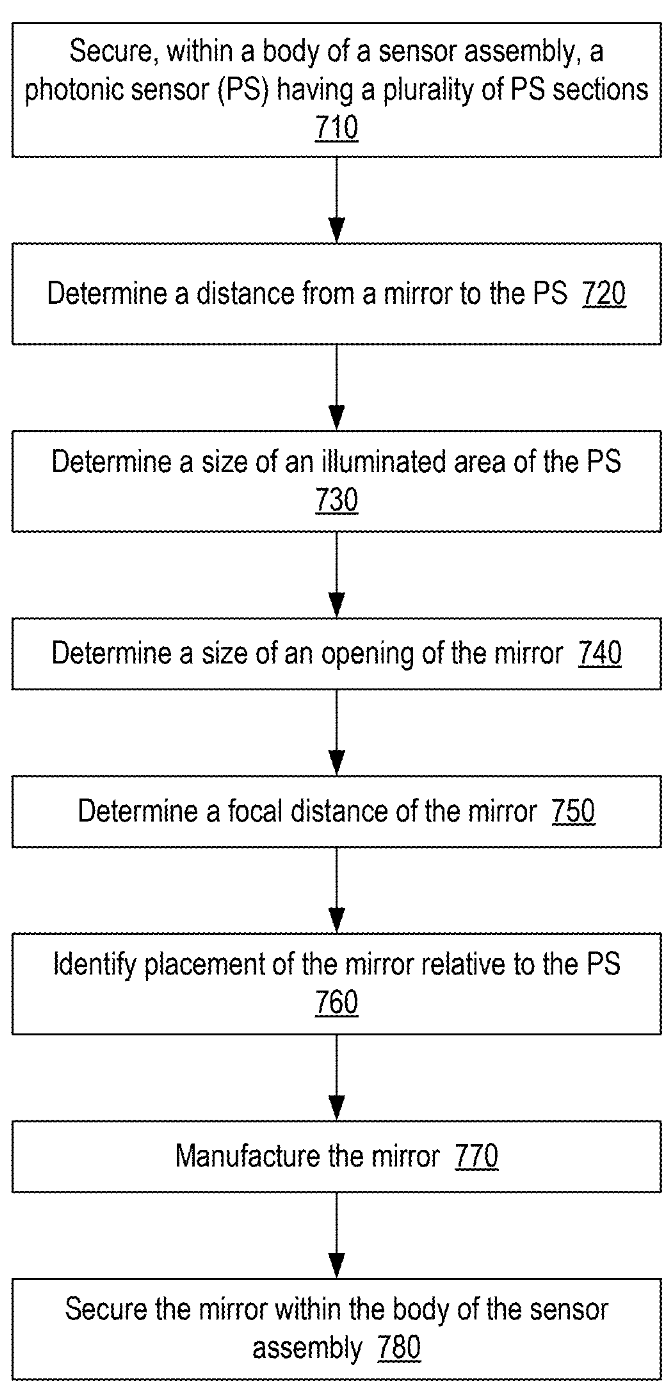
FIG. 7 is a flowchart illustrating an example method of manufacturing a light sensor assembly that can be used for optical sensing of environments encountered in semiconductor manufacturing systems, according to at least one embodiment.

FIG. 7 is a flowchart illustrating an example method 700 of manufacturing a light sensor assembly (optical sensor assembly) that can be used for optical sensing of environments encountered in semiconductor manufacturing systems, according to at least one embodiment. Although various operations of method 700 are depicted using a particular sequence of operations (flowchart blocks), in various embodiments, operations of method 700 can be performed in other suitable orders. In some embodiments, some operations of method 700 can be performed concurrently with other operations.

At block 710, method 700 can include securing (e.g., placing and affixing), within a body of the sensor assembly a photonic sensor (PS), e.g., photodetector 114 in FIG. 1 and FIG. 2A, and/or the like. The PS can include multiple PS sections, e.g., sections 114-*n* in FIG. 4 and FIG. 5A, sections 201 . . . 204 in FIG. 2, and/or the like. The PS can operate in a visible light range, infrared (IR) range, ultraviolet (UV) range, and/or any other suitable optical range or a combination thereof.

At block 720, method 700 can include determining a distance h from a mirror to the PS. In some embodiments, distance h can be counted from an opening of the mirror (e.g., opening 311 in FIG. 4 and FIG. 5A) to the top PS surface (e.g., top surface of photodetector section 114-1). In some embodiments, distance h can be fixed as part of specification of the PS assembly.

At block 730, method 700 can include determining a size of an illuminated area of the PS, e.g., a radius r of the illuminated spot (e.g., spot CD in FIG. 5B). In some embodiments, the size of the illuminated area can be determined as the full size of an available array of photodetector sensing elements or a size of a certain portion of such array (e.g., 90% of the photodetector, in diameter or area).

At block 740, method 700 can continue with determining a size of an opening of the mirror (e.g., a radius R of opening AB in FIG. 5B). The mirror can include a plurality of optical sections (OSs) positioned about an axis of the mirror (e.g., sections 301 . . . 304 in FIG. 3B). The opening of each OS of the plurality of OSs (e.g., openings 311 . . . 313 in FIG. 3A) can face a respective PS section of the plurality of PS sections (e.g., openings 311 and 312 facing photodetector sections 114-1 and 114-2 in FIG. 4, respectively). Various OSs can be configured to collect a portion of an incident beam of light and direct, through the opening, the collected portion of the incident beam of light towards the respective PS section (e.g., as illustrated in FIG. 4). In some embodiments, individual OSs can have parabolic shapes. In some embodiments, individual OSs of the plurality of OSs are positioned symmetrically about the axis of the mirror.

At block 750, method 700 can continue with determining a focal distance $f$ (or focal distance $\tilde{f}$) of the mirror. At block 760, method 700 can include identifying a placement of the mirror relative to the PS (e.g., distance h in FIG. 4). In some embodiments, a size of the opening R, a size of an area r of the PS illuminated by the incident beam of light, and distance h from the mirror to the PS can be fixed by the PS assembly design or specification whereas the focal distance $f$ is determined based on these parameters. In some embodiments, the focal distance $f$ can be set to cause rays of the incident beam (e.g., rays AD and BC in FIG. 5A), reflected from a rim of the opening (e.g., points A and B in FIG. 5A), to strike an edge of the area of the PS (e.g., edge points C and D in FIG. 5A) illuminated by the incident beam of light.

In some embodiments, the focal distance can be determined using the function $f=f(R,r,h)$ disclosed above (or a similar function for $\tilde{f}$). In some embodiments, fewer than three parameters R, r, h can be fixed. For example, the size of the illuminated spot r and the size of the opening R can be fixed by the design of the PS assembly while the distance h and the focal distance $f$ can be determined based on optimization and subject to the constraint $f=f(R,r,h)$. More specifically, such a constraint means that the changes in the $\Delta f$ are related by the condition (for example, for fixed R and r), $$\Delta f \approx \frac{\partial f(R, r, h)}{\partial h} \Delta h.$$

Specific values h and $f$ can then be selected subject using auxiliary optimization constraints, including but not limited to overall size of the PS assembly, heating/cooling efficiency of the PS assembly, cost of the materials, cost of manufacturing, and or the like.

In another example, only the size of the illuminated spot r (or some other single parameter, e.g., h) can be fixed by the design of the PS assembly while the size of the opening R, the distance h, and the focal distance $f$ can be determined based on optimization and subject to the constraint, $$\Delta f \approx \frac{\partial f(R, r, h)}{\partial h} \Delta R + \frac{\partial f(R, r, h)}{\partial h} \Delta h,$$

whereas all three parameters R, h, and $f$ are determined based on auxiliary optimization constraints.

At block 770, method 700 can continue with manufacturing the mirror according to the determined parameters R, r, h, and $f$. At block 780, the PS can be combined with the mirror to manufacture the PS assembly, e.g., securing the mirror within the body of the sensor assembly.

In some embodiments, method 700 can further include adding (e.g., securing, affixing, etc.), to the PS assembly, a plurality of filters. Each filter can be positioned in combination with a respective OS. For example, as illustrated in FIG. 4, filter 112-1 can be positioned in combination with section 301 of mirror 300, filter 112-2 can be positioned in combination with section 302 of mirror 300, and so on. The filters can be configured to reduce transmission of light in at least one range of wavelengths of the incident beam. For example, a first filter (e.g., filter 112-1 in FIG. 4) positioned in combination with a first OS (e.g., first section 301) can be configured to reduce transmission of light in a first range of wavelengths (e.g., $\Lambda_1$), a second filter (e.g., filter 112-2 in FIG. 4) positioned in combination with a second OS (e.g., second section 302) can be configured to reduce transmission of light in a second range of wavelengths (e.g., $\Lambda_2$), and so on.

In some embodiments, one or more filters of the plurality of filters can be positioned between the mirror and the PS. In some embodiments, one or more filters of the plurality of filters can be positioned in front of the mirror (e.g., as illustrated in FIG. 4). In such embodiments, the focal distance $f$ of the mirror can be further determined based on a distance from the one or more filters to the PS. For example, the function $f=f(R,r,h)$ can be modified to account for the refraction of light through the filters and the resulting change in the geometry of light propagation through the PS assembly.

It is to be understood that the above description is intended to be illustrative, and not restrictive. Many other embodiment examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. An optical sensor assembly comprising:

a photonic sensor (PS) comprising a plurality of PS sections; and a mirror comprising a plurality of optical sections (OSs) positioned about an axis of the mirror, wherein each OS of the plurality of OSs comprises an opening facing a respective PS section of the plurality of PS sections and configured to:

collect a respective portion of a plurality of portions of an incident beam of light, and direct, through the opening, the respective portion of the incident beam of light towards the respective PS section;

and wherein a focal distance of the mirror is set based on one or more of:

a size of the opening, a size of an area of the PS illuminated by the incident beam of light, or a distance from the mirror to the PS.

2. The optical sensor assembly of claim 1, wherein individual OSs of the plurality of OSs have parabolic shape.

3. The optical sensor assembly of claim 1, wherein individual OSs of the plurality of OSs are positioned symmetrically about the axis of the mirror.

4. The optical sensor assembly of claim 1, further comprising:

a plurality of filters, each filter of the plurality of filters positioned in combination with a respective OS of the plurality of OSs and configured to reduce transmission of light in at least one range of wavelengths of the incident beam.

5. The optical sensor assembly of claim 4, wherein the plurality of filters comprises:

a first filter positioned in combination with a first OS of the plurality of OSs and configured to reduce transmission of light in a first range of wavelengths, and a second filter positioned in combination with a second OS of the plurality of OSs and configured to reduce transmission of light in a second range of wavelengths different from the first range of wavelengths.

6. The optical sensor assembly of claim 4, wherein one or more filters of the plurality of filters are positioned between the mirror and the PS, and wherein the focal distance of the mirror is further set based on:

a distance from the one or more filters to the PS.

7. The optical sensor assembly of claim 4, wherein the focal distance of the mirror is set to cause rays of the incident beam of light, reflected from a rim of the opening, to strike an edge of the area of the PS illuminated by the incident beam of light.

8. A photonic inspection system comprising:

a body comprising a gas, wherein the body is coupled to a gas inlet and a gas outlet;

a source of light to generate a light beam propagating through the gas;

a photonic sensor (PS) comprising a plurality of PS sections positioned about an axis of the PS;

a mirror comprising a plurality of optical sections (OSs) positioned about the axis of the PS, wherein each OS of the plurality of OSs comprises an opening facing a respective PS section of the plurality of PS sections and configured to:

collect a respective portion of a plurality of portions of the light beam, and direct, through the opening, the respective portion of the light beam towards the respective PS section; and wherein a focal distance of the mirror is set based on one or more of:

a size of the opening, a size of an area of the PS illuminated by the light beam, or a distance from the mirror to the PS.

9. The photonic inspection system of claim 8, wherein the PS is to:

generate a plurality of sets of PS data, each set of PS data of the plurality of sets of PS data generated by a respective PS section of the plurality of PS sections upon illumination, of the respective PS section, with the respective collected portion of the light beam; and wherein the photonic inspection system further comprises:

a processing device to determine, based at least on the plurality of sets of PS data, an amount of a target substance in the gas.

10. The photonic inspection system of claim 8, wherein the focal distance of the mirror is set to cause rays of the light beam, reflected from a rim of the opening, to strike an edge of the area of the PS illuminated by the light beam.

11. The photonic inspection system of claim 8, wherein individual OSs of the plurality of OSs have parabolic shape.

12. The photonic inspection system of claim 8, wherein individual OSs of the plurality of OSs are positioned symmetrically about the axis of the mirror.

13. The photonic inspection system of claim 8, further comprising:

a plurality of filters, each filter of the plurality of filters positioned in combination with a respective OS of the plurality of OSs and configured to reduce transmission of light in at least one range of wavelengths of the light beam.

14. The photonic inspection system of claim 13, wherein the plurality of filters comprises:

a first filter positioned in combination with a first OS of the plurality of OSs and configured to reduce transmission of light in a first range of wavelengths, and a second filter positioned in combination with a second OS of the plurality of OSs and configured to reduce transmission of light in a second range of wavelengths different from the first range of wavelengths.

15. The photonic inspection system of claim 13, wherein one or more filters of the plurality of filters are positioned between the mirror and the PS, and wherein the focal distance of the mirror is further set based on:

a distance from the one or more filters to the PS.

16. A method of manufacturing a sensor assembly, the method comprising:

securing, within a body of the sensor assembly, a photonic sensor (PS) comprising a plurality of PS sections; and securing, within the body of the sensor assembly, a mirror comprising a plurality of optical sections (OSs) positioned about an axis of the mirror, wherein each OS of the plurality of OSs comprises an opening facing a respective PS section of the plurality of PS sections and configured to:

collect a respective portion of a plurality of portions of an incident beam of light, and direct, through the opening, the respective portion of the incident beam of light towards the respective PS section; and wherein a focal distance of the mirror is set based on one or more of:

a size of the opening, a size of an area of the PS illuminated by the incident beam of light, or a distance from the mirror to the PS.

17. The method of claim 16, wherein the focal distance of the mirror is set to cause rays of the incident beam of light, reflected from a rim of the opening, to strike an edge of the area of the PS illuminated by the incident beam of light.

18. The method of claim 16, further comprising:

positioning, within the body of the sensor assembly, a plurality of filters, each filter of the plurality of filters positioned in combination with a respective OS of the plurality of OSs and configured to reduce transmission of light in at least one range of wavelengths of the incident beam.

19. The method of claim 18, wherein the plurality of filters comprises:

a first filter positioned in combination with a first OS of the plurality of OSs and configured to reduce transmission of light in a first range of wavelengths, and a second filter positioned in combination with a second OS of the plurality of OSs and configured to reduce transmission of light in a second range of wavelengths different from the first range of wavelengths.

20. The method of claim 18, wherein one or more filters of the plurality of filters are positioned between the mirror and the PS, and wherein the focal distance of the mirror is further set based on:

a distance from the one or more filters to the PS.

* * * * *